（12） United States Patent
Liu et al.

(10) Patent No.: US 10,310,327 B2
(45) Date of Patent: Jun. 4, 2019

(54) BACKLIGHT MODULE HAVING BRIGHTNESS ENHANCEMENT DESIGN AT PERIPHERY OF DISPLAY SURFACE

(71) Applicant: AU OPTRONICS CORPORATION, Hsin-Chu (TW)

(72) Inventors: Yung-Hsin Liu, Hsin-Chu (TW); Chiung-Han Wang, Hsin-Chu (TW); Li-Jia Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 452 days.

(21) Appl. No.: 15/072,878

(22) Filed: Mar. 17, 2016

(65) Prior Publication Data

US 2016/0273733 A1   Sep. 22, 2016

(30) Foreign Application Priority Data

Mar. 20, 2015   (TW) .............................. 104109022 A

(51) Int. Cl.
*G02F 1/1335* (2006.01)

(52) U.S. Cl.
CPC .. *G02F 1/133603* (2013.01); *G02F 1/133605* (2013.01); *G02F 1/133608* (2013.01); *G02F 1/133611* (2013.01)

(58) Field of Classification Search
CPC ......... G02F 1/133602; G02F 1/133603; G02F 1/133605; G02F 1/133606; G02F 1/133607; G02F 1/133611; G02F 1/133608; G02F 2001/133607; G02F 1/133524; G02B 6/0055; G02B 6/0031; G02B 6/0096

See application file for complete search history.

(56) References Cited

U.S. PATENT DOCUMENTS

| 7,821,593 | B2 | 10/2010 | Lin |
| 8,310,615 | B2 | 11/2012 | Chang et al. |
| 9,454,037 | B2* | 9/2016 | Lee ................... G02F 1/133504 |
| 2007/0047261 | A1 | 3/2007 | Thompson et al. |
| 2009/0059126 | A1* | 3/2009 | Koganezawa .... G02F 1/133611 349/64 |

(Continued)

FOREIGN PATENT DOCUMENTS

| CN | 101253444 A | 8/2008 |
| CN | 102855826 | 1/2013 |

(Continued)

*Primary Examiner* — Erin Kryukova
(74) *Attorney, Agent, or Firm* — McClure, Qualey & Rodack, LLP

(57) ABSTRACT

A backlight module includes a supporting plate, a light source module, and an optical modulation film. The light source module includes a plurality of light sources disposed on a supporting surface of the supporting plate. The optical modulation film is disposed above the light source module and has a plurality of light emitting holes. Light from the light source module is distributed by the optical modulation film and emitted via light emitting holes at different positions. The optical modulation film has a periphery area and a central area. An average perpendicular distance between the periphery area and the supporting surface is different from an average perpendicular distance between the central area and the supporting surface.

24 Claims, 9 Drawing Sheets

(56) References Cited

U.S. PATENT DOCUMENTS

| | | | | |
|---|---|---|---|---|
| 2015/0219324 A1* | 8/2015 | Kim | ................... | G02F 1/133305 |
| | | | | 349/58 |
| 2015/0253623 A1* | 9/2015 | Lee | ................... | G02F 1/133504 |
| | | | | 349/64 |
| 2015/0285467 A1* | 10/2015 | Choi | ......................... | G09F 9/30 |
| | | | | 362/97.1 |
| 2015/0292712 A1* | 10/2015 | Nameda | ............ | G02F 1/133611 |
| | | | | 362/97.1 |
| 2015/0293405 A1* | 10/2015 | Park | ................... | G02F 1/133608 |
| | | | | 349/69 |
| 2016/0057850 A1* | 2/2016 | Kang | ................ | G02F 1/133308 |
| | | | | 361/749 |
| 2016/0061414 A1* | 3/2016 | Song | ................. | G02F 1/133603 |
| | | | | 362/97.1 |
| 2016/0223726 A1* | 8/2016 | Kwon | ................. | G02B 5/0278 |

FOREIGN PATENT DOCUMENTS

| | | |
|---|---|---|
| CN | 10359155 | 2/2014 |
| TW | M255419 | 1/2005 |
| TW | I361308 | 1/2009 |
| TW | I317837 | 12/2009 |
| TW | 2010039021 | 11/2010 |
| TW | M255419 | 1/2011 |
| TW | I391755 | 4/2013 |

* cited by examiner

BACKLIGHT MODULE HAVING BRIGHTNESS ENHANCEMENT DESIGN AT PERIPHERY OF DISPLAY SURFACE

BACKGROUND

1. Technical Field

The present disclosure generally relates to a backlight module; particularly, the present disclosure relates to a backlight module having brightness enhancement design at periphery of display surface.

2. Description of the Related Art

Backlight modules are an important component of display devices. Light emitted from the light source is adjusted in light distribution by the optical film material in the backlight module to directly affect the display effects (ex. display brightness and display quality). In exemplary terms of a direct-type backlight module utilizing light-emitting diodes (LED) as a light source, when the LEDs generate light, the light source would be considered a point light source. After the light is then guided by the optical film material to become a surface light source, the light is then outputted to be provided as the light required by the display device.

However, in contrast to the center of a display area where light can be received from the light source in every which way direction, light that may be received by the periphery corners of the display area is comparatively more limited. As a result, traditional display devices will typically and easily have circumstances where the corners or periphery areas of the display area have dark bands or non-uniform brightness levels. To alleviate this problem, some traditional display devices have increased reflective structures installed at the four corners of their backlight modules in order to increase the brightness levels in the corner areas. However, this method would subsequently result in increased manufacturing costs. Therefore, there is still room for improvement for backlight modules of traditional display devices.

SUMMARY

It is an objective of the present disclosure to provide a backlight module to improve situations of dark patches at the periphery edges of display devices.

According to one aspect of the invention, a backlight module is provided. The backlight module includes a supporting plate, a light source module, and an optical modulation film. The light source module includes a plurality of light sources and disposed on a supporting surface of the supporting plate. The optical modulation module is disposed above the light source module and has a plurality of light exiting holes. The optical modulation module distributes light generated from the light source module to emit out of the light exiting holes at different positions. The optical modulation film has a periphery area and a central area, wherein an average perpendicular distance between the periphery area and the supporting surface is different from an average perpendicular distance between the central area and the supporting surface.

In addition, a peripheral projecting area and a central projecting area are respectively formed in the periphery area and the central area above the supporting surface. The corresponding relationship between the central area and the central projecting area is relatively closer to being parallel in comparison to the corresponding relationship between the peripheral area and the peripheral projecting area. Through changes in the perpendicular distance between the optical modulation film and the supporting surface, the light distribution can be adjusted to increase brightness levels of the peripheral area and decrease dark spots.

DETAILED DESCRIPTION OF THE PREFERRED EMBODIMENT

The present invention provides a backlight module having brightness enhancement design for periphery of the display surface, wherein curvatures are formed at peripheral areas of the optical modulation module to modulate light emitting out from the light source to be smoother in light distribution in order to improve display effects. Said light source preferably utilizes light emitting diodes (LED), and the display device preferably utilizes liquid-crystal display panels (LCD panels); however, the present invention is not limited to this setup.

Figure 1:
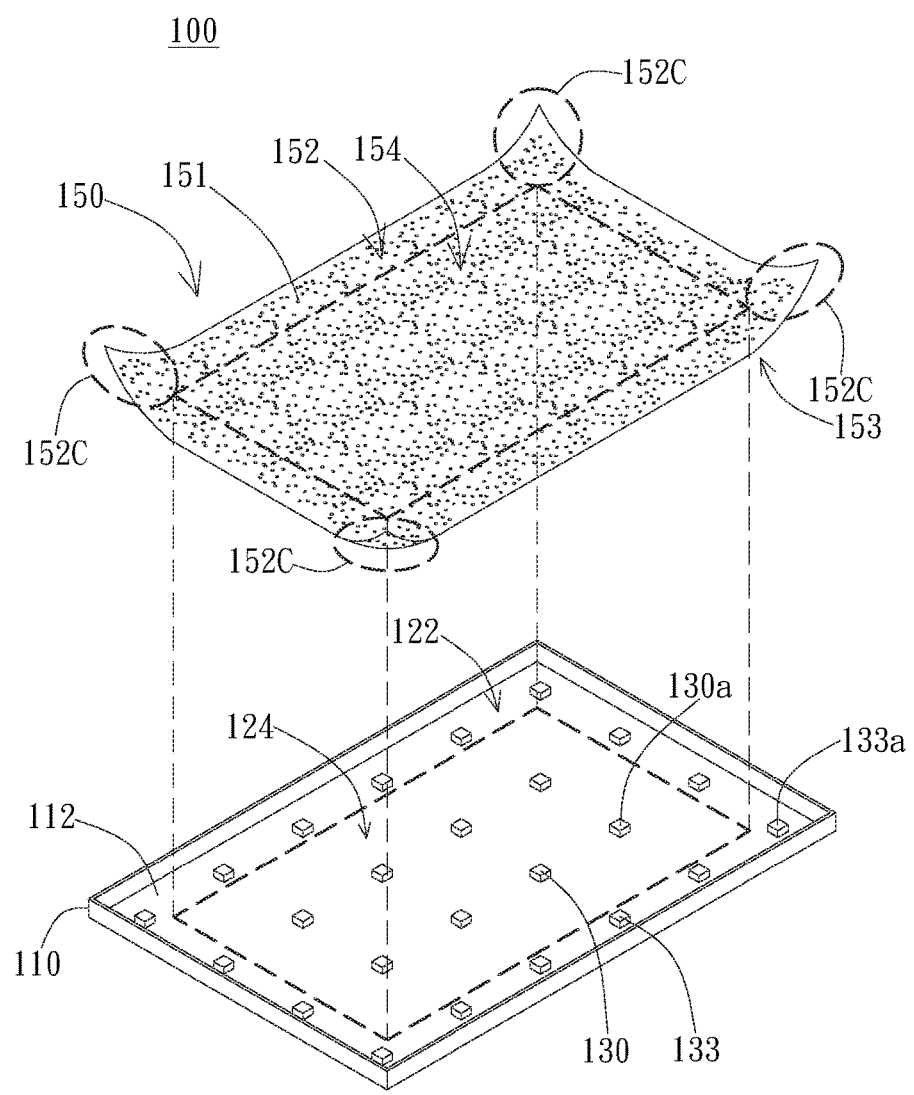
FIG. 1 is an exploded view of a first embodiment of the backlight module of the present invention.

FIG. 1 is an exploded view of a first embodiment of the backlight module 100 of the present invention. As illustrated in FIG. 1, the backlight module 100 includes supporting plate 110, optical modulation film 150, and a light source module having a plurality of light sources 130. The supporting plate 110 has supporting surface 112, wherein the supporting plate 110 can be made from metallic materials or made from a composite of a plastic material with a coating of reflective material. The plurality of light sources 130 is disposed on the supporting surface 112 of the supporting plate 110, wherein the light sources 130 with the control circuit connected thereto (not shown) collectively form the light source module. Optical modulation film 150 is disposed above the light source module. The optical modulation film 150 is an optical film with a multi-holed structure for distributing light generated by the light source module. As illustrated in FIG. 1, the optical modulation film 150 has a reflective surface 153 facing the supporting surface 112 to provide light reflecting effects, wherein the optical modulation film 150 has a plurality of light exiting holes 151. The optical modulation film 150 reflects light that is not exiting through the light exiting holes 151 to other positions in order to distribute light generated by the light source module to exit through light exiting holes 151 at different positions.

As illustrated in FIG. 1, the optical modulation film 150 has a periphery area 152 and a central area 154. The periphery area 152 refers to the portions adjoining the edges and corners of the optical modulation film 150. Conversely, the central area 154 is surrounded by the periphery area 152 and does not adjoin with the edge and corner portions.

However, in other different embodiments, the periphery area 152 may also refer only to a portion on the optical modulation film 150 in closer proximity than the central area 154 to the peripheral edges or corners, wherein surrounding the central area 154 is not a necessity. A periphery projecting area 122 and a central projecting area 124 are respectively formed in the periphery area 152 and the central area 154 above the supporting surface 112. As illustrated in FIG. 1, the central area 154 corresponds to the central projecting area 124 above the supporting surface 112 in the projection direction. The peripheral projecting area 122 that corresponds to the peripheral area 152 in the projection direction is the portion not part of the central projecting area 124. The peripheral area 152 includes a corner area 152C corresponding to a corner of the optical modulation film 150.

In terms of light sources, the light source 130 includes periphery light source 133, wherein the periphery light source 133 is relatively closer in proximity to the peripheral edge of the supporting surface 112 in comparison to the other light sources 130 (ex. periphery light source 133a is closer to the edge of the supporting surface 112 than light sources 130a). In other words, the periphery light source 133 is disposed at a position adjoining a side and corner of the supporting surface 112. A portion of the periphery light source 133 may also be disposed corresponding to the corner area 152C, such as periphery light source 133a for instance. As illustrated in FIG. 1, the relative relationship between the central area 154 and the central projecting area 124, in comparison to the relative relationship between the periphery area 152 and the periphery projecting area 122, is close to parallel. In terms of the present embodiment, the central area 154 and the central projecting area 124 are substantially parallel surfaces, whereas the periphery area 152 and the periphery projecting area 122 are substantially two non-parallel (to each other) surfaces. In addition, in the present embodiment, the optical modulation film 150 forms a warped shape with an upward flap/flip at the corner area 152C (ie. flipping or flapping in the direction away from the supporting plate 110).

Figure 2A:
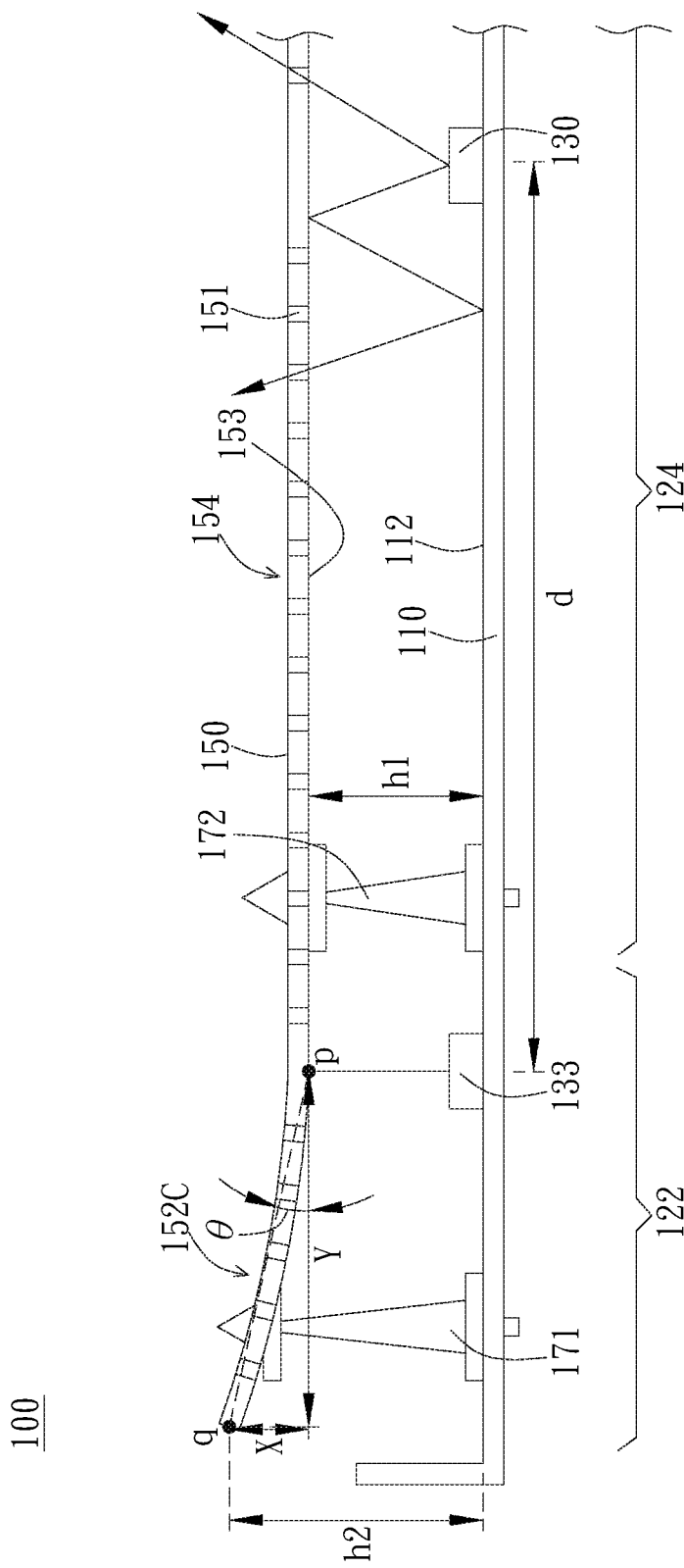
FIGS. 2A and 2B are cross-sectional views the embodiment in FIG. 1.
Figure 2B:
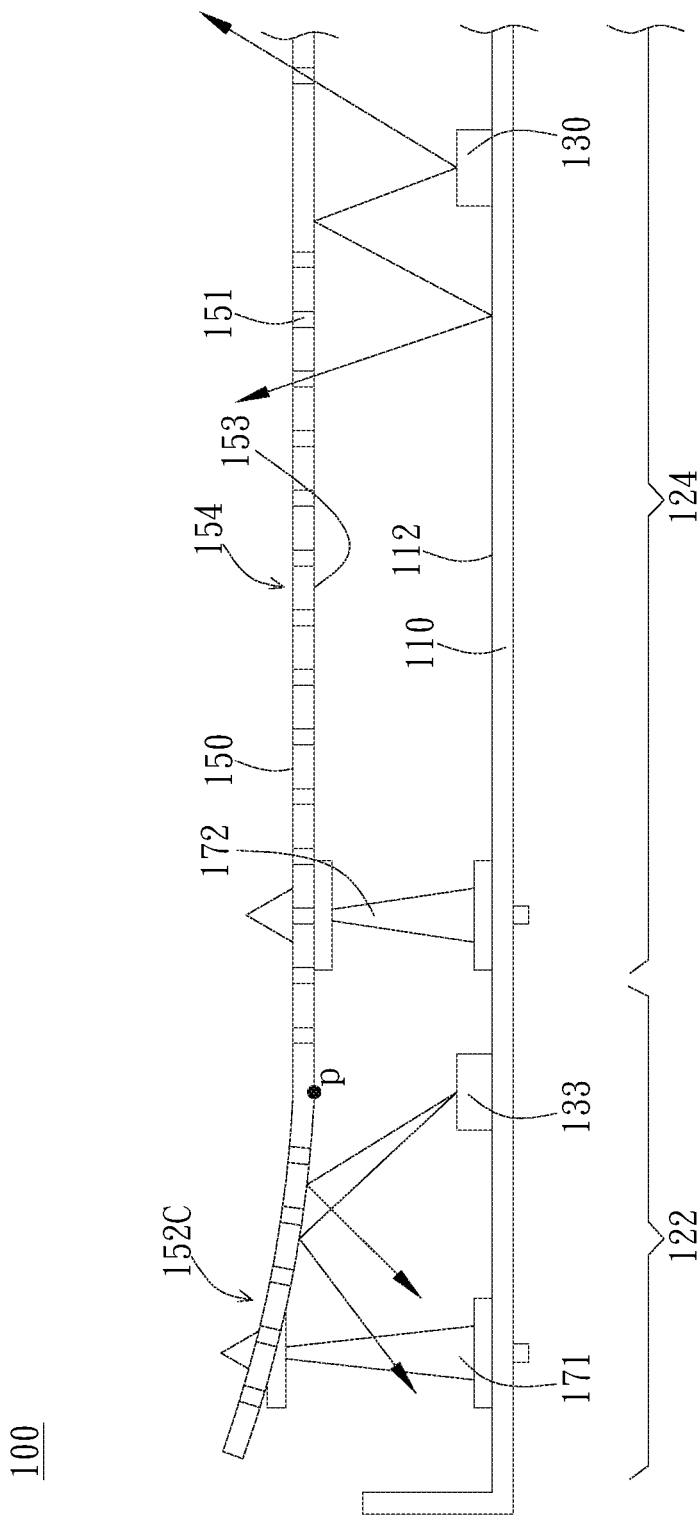

Please refer to FIGS. 2A and 2B. FIGS. 2A and 2B are cross-sectional views of the backlight module 100 corresponding to the corner area 152C. As illustrated in FIG. 2A, light generated by the light source 130 can be reflected back and forth between the reflective surface 153 and the supporting surface 112, and then exit out of the optical modulation film 150 through the light exiting holes 151. In other words, light exits out of the optical modulation film 150 at different positions through the light exiting holes 151 to achieve the effect of distributing the light source. In addition, a first supporting unit 171 and a second supporting unit 172 are disposed on the supporting surface 112. The first supporting unit 171 is disposed on the supporting surface 112 and sustains the corner area 152C. The second supporting unit 172 is disposed on the supporting surface 112 and sustains the central area 154. In the embodiment of FIG. 2A, the length of the first supporting unit 171 is greater than the length of the second supporting unit 172. The optical modulation film 150 uses the second supporting unit 172 as an anchor point or fixing point, and then in coordination with the first supporting unit 171 that has relatively longer length, the corner area 152C of the optical modulation film 150 is sustained or supported by the first supporting unit 171 to form a curved or flat surface that is non-parallel with the supporting surface 112. In more definite terms, the average perpendicular distance between the corner area 152C and the supporting surface 112 is different from the average perpendicular distance between the central area 154 and the supporting surface 112. As illustrated in FIG. 2A, the periphery light source 133 has a light source projecting position p (preferably a forward facing direction of projection position) above the optical modulation film 150. As the distance between each position in the periphery area with the light source projecting position p increases, the perpendicular distance with the supporting surface 112 will also increase Particularly, as the distance between each position in the corner area 152C and the light source projecting position p increases, the perpendicular distance therebetween with the plane that the periphery projection area 122 lies on also increases. In other words, the closer the position is towards the corner, the perpendicular distance between the optical modulation film 150 and the supporting surface 112 will increase. As illustrated in FIG. 2B, through the design of gradual increase in the perpendicular distance between the corner area 152C and the supporting surface 112, the periphery light source 133 can increase the angle of incidence of light between the corner area 152C and the reflective surface 153. Accordingly, light emitted towards the corner area 152C that has not passed through the optical modulation film 150 will have its angle of reflection increased after being reflected. In this manner, emitted light can be distributed more towards the periphery to increase brightness levels of the periphery areas.

Furthermore, the corner area 152C has a vertex position q that is the farthest distance from the light source projecting position p. A horizontal distance between the vertex position q and the light source projecting position p is Y. There is a perpendicular distance h2 between the vertex position q and the supporting surface 112 (ie. there is a perpendicular distance h2 between the vertex position q and the plane that the periphery projecting position p lies on). There is a perpendicular distance h1 between the central area 154 and the supporting surface 112. The difference between the perpendicular distance h2 and the perpendicular distance h1 is X. At the point where the optical modulation film 150 intersects with the line through the vertex position q and the light source projecting position p, the angle between the optical modulation film 150 and the horizontal plane of the light source projecting position p is called angle θ. The relationship between X, Y, and θ satisfy the following:

$$\tan^{-1}(X/Y)=\theta$$

Testing on the backlight module has found, with regards to output light distribution, that when the perpendicular distance h1 is smaller than 10 mm, an angle θ smaller than 10 degrees can increase brightness levels in the corner area. In addition, by adjusting the horizontal distance Y between the vertex position q and the light source projecting position p to be substantially 0.4~0.6 times the spacing distance d between neighboring light sources (ie. 0.4d≤Y≤0.6d), brightness levels in the corner area may be increased more effectively. Further tests also show that when $\tan^{-1}(X/Y)$ is between 3 and 5 degrees, the light output is better. In this manner, during the product development stage and in accordance to the above mentioned relationship and testing results, with the required perpendicular distance between the central area and supporting surface determined, the curvature levels of the optical modulation film 150 may be suitably adjusted to accomplish better display quality.

Figure 3:
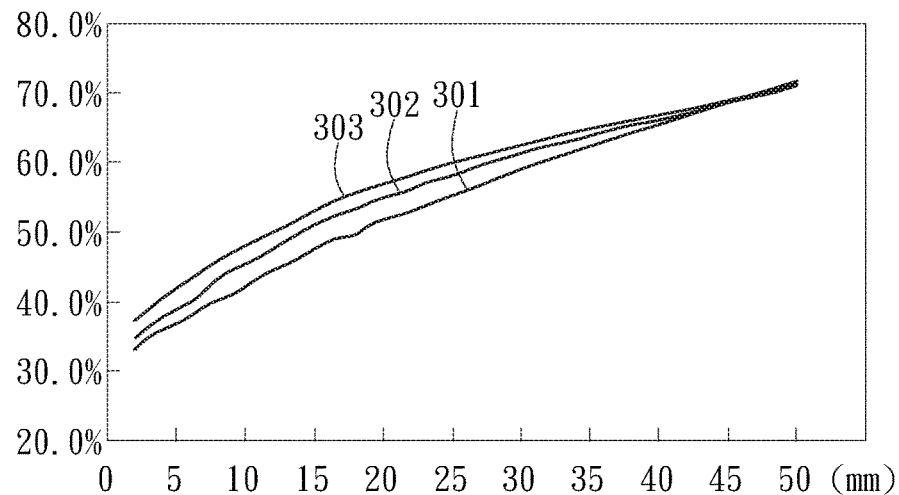
FIG. 3 is a view of the distribution of brightness between the central area and each position of the periphery area.
Figure 4:
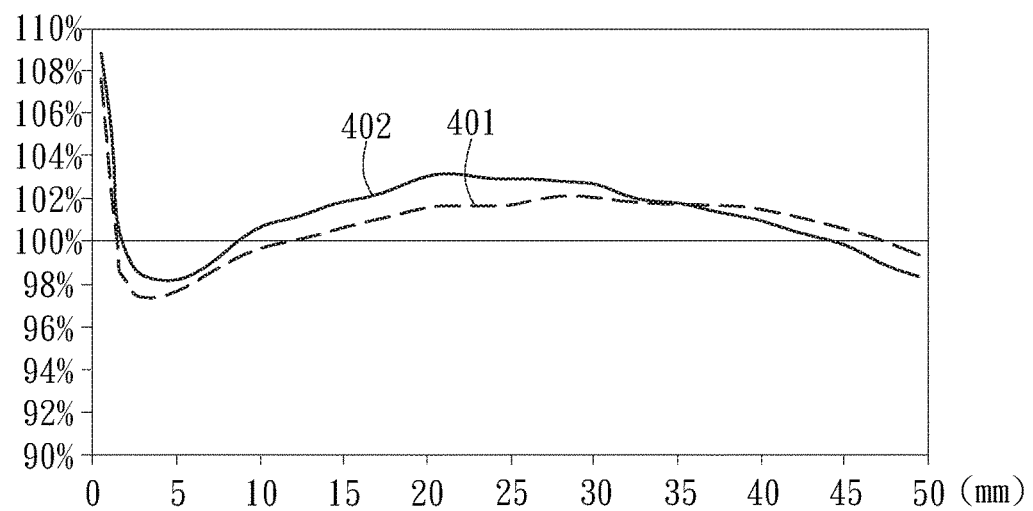
FIG. 4 is a view of the distribution of brightness between the central area and each position of the periphery area.

Please refer to the testing results illustrated in FIGS. 3 and 4. FIG. 3 is an illustrative diagram of the distribution of brightness levels of each periphery position in relation to the central area. In FIG. 3, each curvature line represents corresponding brightness distributions at different positions according to different angles at which the corner area of the optical modulation film is raised or lifted. Curvature line 301 is a reference curve, wherein curvature line 301 corresponds to when the optical modulation film is horizontally disposed (ie. angle of 0 degrees). Curvature lines 203 and 303 are respectively distribution curves with an angle of 2 degrees and 4 degrees. As illustrated in FIG. 3, within the range of 50 mm to the vertex position in the corner area, the corresponding brightness levels in the corner area increases as the angle increases. In contrast to curvature line 301, the corresponding noticeable increasing and decreasing brightness levels of curvature lines 302 and 303 are smoother closer towards the corner area vertex position. In other words, the light distribution near the corners of the display surface will be relatively smooth, wherein dark spots resulting from sudden decreases in brightness can be avoided.

FIG. 4 is a brightness distribution of different positions in the periphery area with different angles. In FIG. 4, the horizontal axis, with the vertex position of the corner area as its origin, is the distance from the origin going away from the central area. The vertical axis represents the ratio of brightness in the corner area of the different lifting angles. Curvature line 401 represents the brightness ratio at different positions when the optical modulation film is being lifted 4 degrees relative to the horizontal positioning of the optical modulation film. Curvature line 402 represents the brightness ratio at different positions when the optical modulation film is being lifted 4 degrees relative to the optical modulation film being lifted 2 degrees instead. As the curvature 401 in FIG. 4 illustrates, in the example of the optical modulation film being lifted 4 degrees relative to the optical film being horizontally disposed, the brightness levels is significantly increased within the 15~45 mm range of the corner area vertex position. From curvature line 402, it can be seen that in the example of the optical modulation film being lifted 4 degrees relative to the optical modulation film being lifted 2 degrees that the brightness significantly increases within a 10~40 mm range of the corner area vertex position. In other words, as the angle increases, the area with increases in light slowly moves towards the corner area. In this manner, light distribution close to the corners of the display surface can be made more uniform in order to provide better display qualities.

Figure 5:
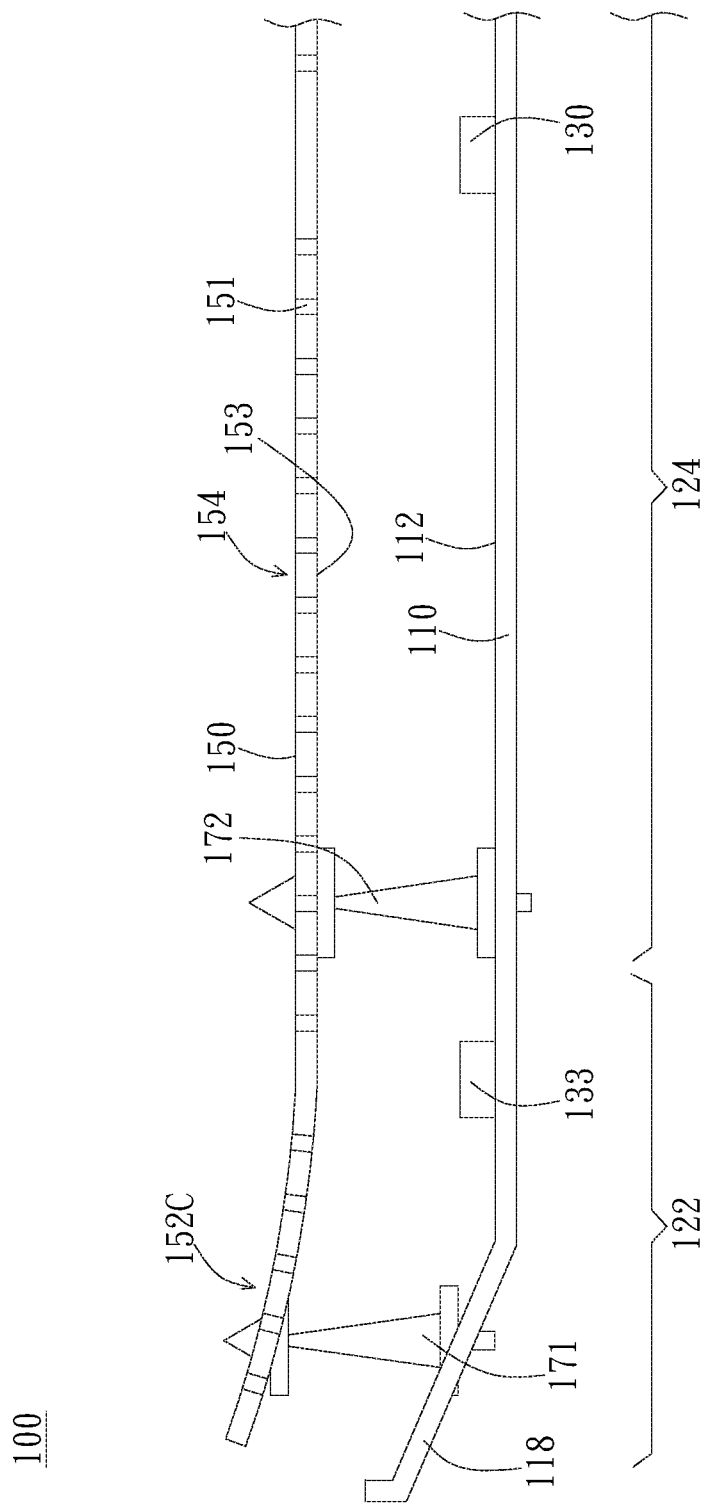
FIG. 5 is a cross-sectional view of a second embodiment of the backlight module of the present invention.
Figure 6:
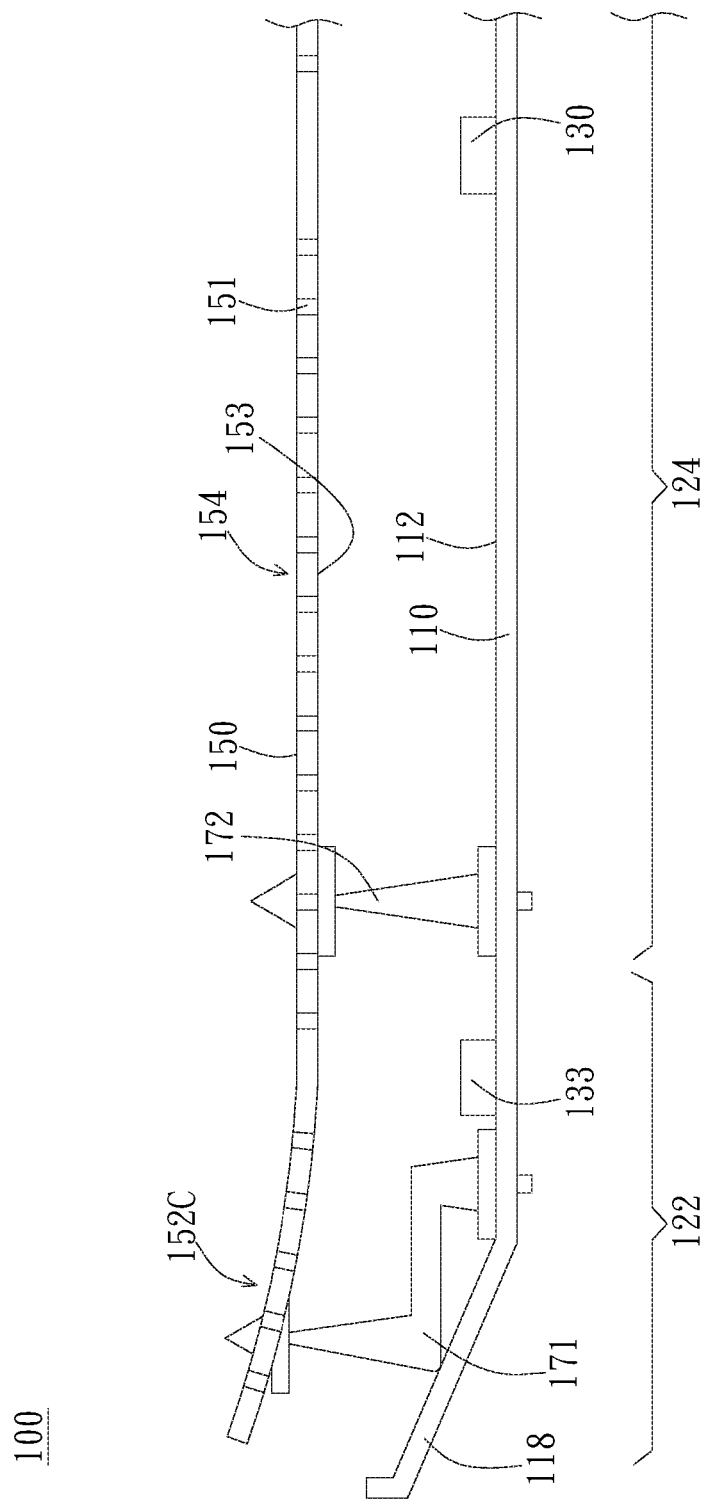
FIG. 6 is a cross-sectional view of a third embodiment of the backlight module of the present embodiment.

In the previous embodiment, the first supporting unit is designed as an extension to support or prop up the optical modulation film, wherein the different methods illustrated in FIGS. 5 and 6 may be utilized to accomplish the task of supporting the optical modulation film. As shown in FIG. 5, supporting plate 110 includes an inclined sidewall 118 surrounding the supporting surface 112. The first supporting unit 171 is disposed on the inclined sidewall 118 of the supporting plate 110 and supports or sustains the corner area 152C. Without changing the design of the supporting unit and by utilizing the inclined sidewall of the supporting plate to lift up the level of height of the first supporting unit 171, the corner area 152C of the optical modulation film 150 can be curved. In addition, as shown in FIG. 6, the first supporting unit 171 is disposed on the supporting surface 112 and extends to on top of the inclined sidewall 118 to support the corner area 152C. In this manner, without changing the position of the fixing hole on the supporting surface where the supporting unit is fixed to support light modulation film, the first supporting unit 171 can be extended to lie against the inclined sidewall to accomplish the effect of the first supporting unit providing support in the periphery area.

Figure 7:
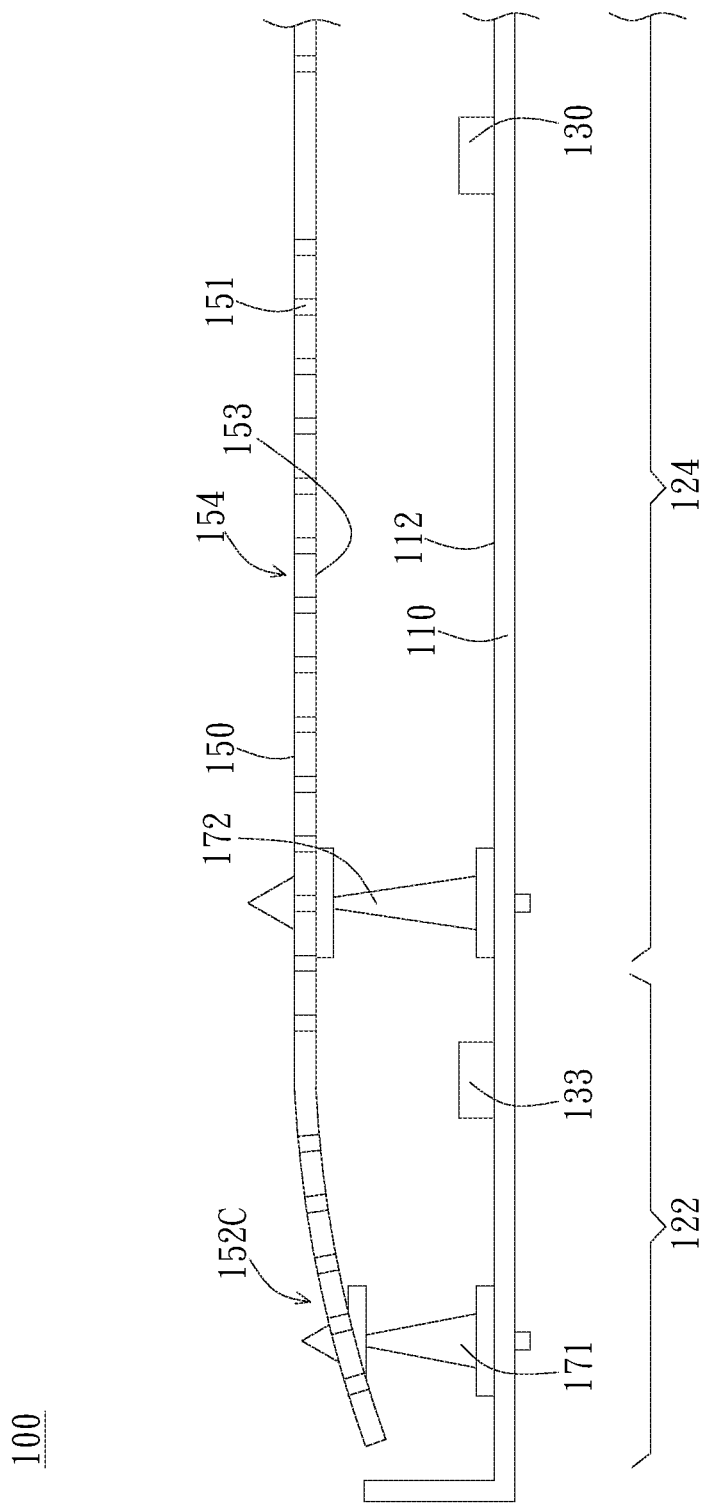
FIG. 7 is a cross-sectional view of a fourth embodiment of the backlight module of the present embodiment.

The optical modulation film can be adjusted to different curvature structures according to requirements. Please refer to the cross-sectional diagram in FIG. 7 of an embodiment of the backlight module 100. As shown in FIG. 7, in the corner area 152C of the optical modulation film 150, the optical modulation film 150 can be formed as a downward curvature structure. The first supporting unit 171 is disposed on the supporting surface 112 and supports the corner area 152C, and the second supporting unit 172 is disposed on the supporting surface 112 and supports the central area 154. In the embodiment of FIG. 7, the length of the first supporting unit 171 is smaller than the length of the second supporting unit 172. With the second supporting unit 172 as a fixing point and in conjunction with the shorter length of the first supporting unit 171, the optical modulation film 150 bends downward (ie. bending in the direction towards the supporting plate 110) to form a non-parallel or horizontal curved surface to the supporting surface 112. By the design of decreasing the perpendicular distance of the corner area 152C with the supporting surface 112, the angle between light traveling into the corner area 152C and the reflective surface 153 can be decreased. In this manner, light that has traveled to the corner area 152C but has not pass through the optical modulation film 150 will have a smaller angle of entry into the corner area 152C after subsequently being reflected back into the corner area 152C by the reflective surface 153. In this manner, emitted light can be more concentrated in distribution in order to decrease brightness in the periphery area. For instance, when bright spots appear in the periphery area of the display surface, light can be concentrated towards the central area in the manner shown in FIG. 7 to avoid bright spots from appearing at a particular place in the periphery area.

Figure 8:
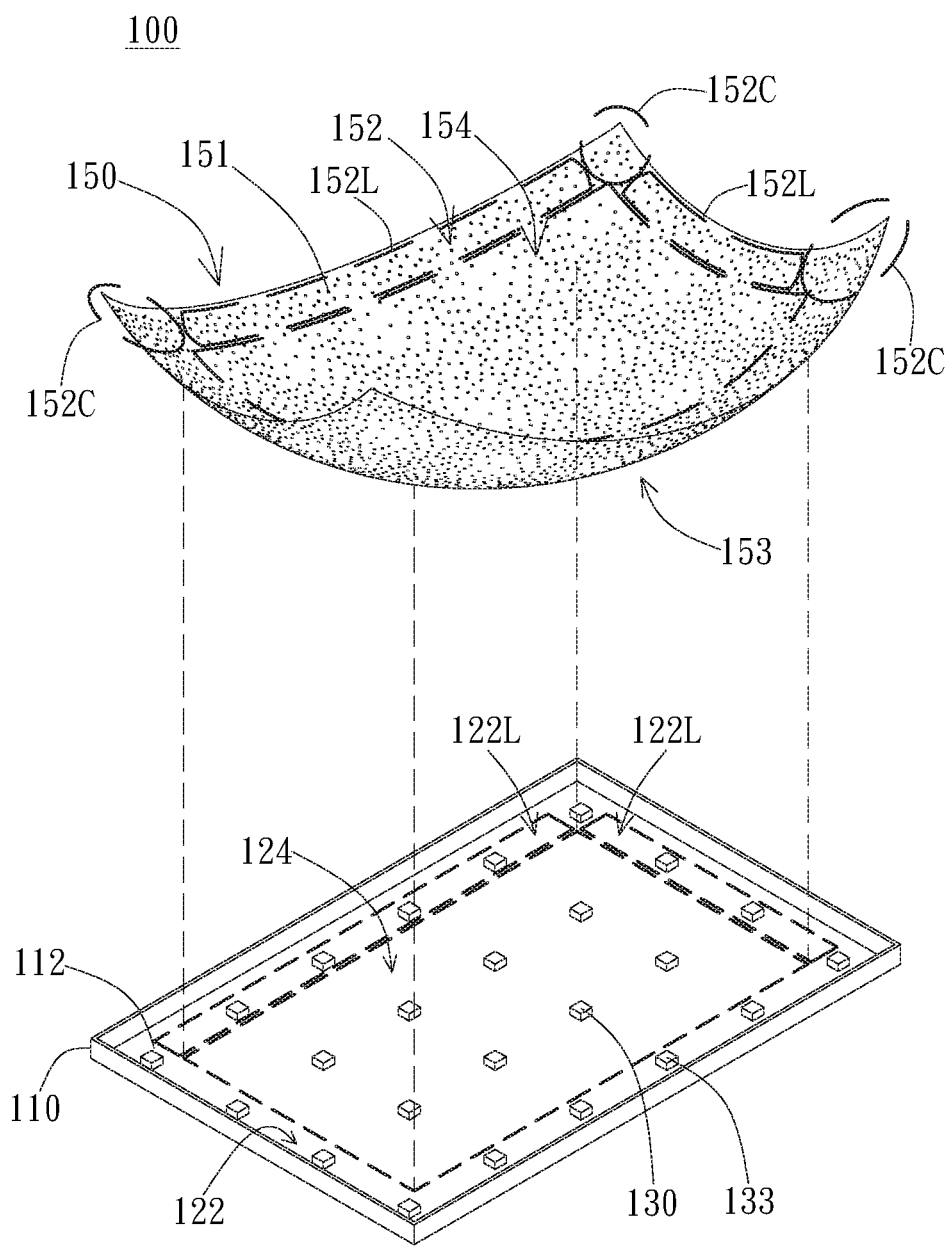
FIG. 8 is an exploded view of a fifth embodiment of the backlight module of the present embodiment.

FIG. 8 illustrates an exploded diagram of a fifth embodiment of the backlight module 100. The difference between the present embodiment with the embodiments of FIGS. 1 and 2 is that the corner areas and the periphery areas of the optical modulation film 150 are curved in a flipped or lifted-up manner (ie. curved in the direction away from the supporting plate 110). The optical modulation film 150 has periphery area 152 and central area 154. The periphery area 152 and the central area 154 has a periphery projecting area 122 and a central projecting area 124 respectively on top of the supporting surface 112. As illustrated in FIG. 8, the periphery area 152 includes periphery area 152L, wherein the distribution of the periphery area 152L extends along the side of the optical modulation film 150. The periphery area 152L forms a periphery projecting area 122L above the supporting surface 112. For ease of labeling, the diagram illustrates two periphery areas and periphery projecting areas. However, it should be noted or understood that the periphery area and the periphery projecting area are respectively positioned around the four sides of the optical modulation film and the supporting surface. In terms of light source 130, the light source 130 includes periphery light source 133, wherein the periphery light source 133 is relatively closer to the periphery of the supporting surface 112 (ie. near a position adjoining the periphery of the supporting surface 112 and the corner). The periphery light source 133 may also be disposed corresponding to the periphery area 152L. As illustrated in FIG. 8, the corresponding relationship between the central area 154 and the central projecting area 124 is relatively more parallel to each other in comparison to the corresponding relationship between the periphery area 152L and the periphery projecting area 122L. In other words, the curvature rate of the surface of the central area 154 is relatively smaller, wherein in contrast the surface of the periphery area 152L has a larger rate of curvature.

Figure 9:
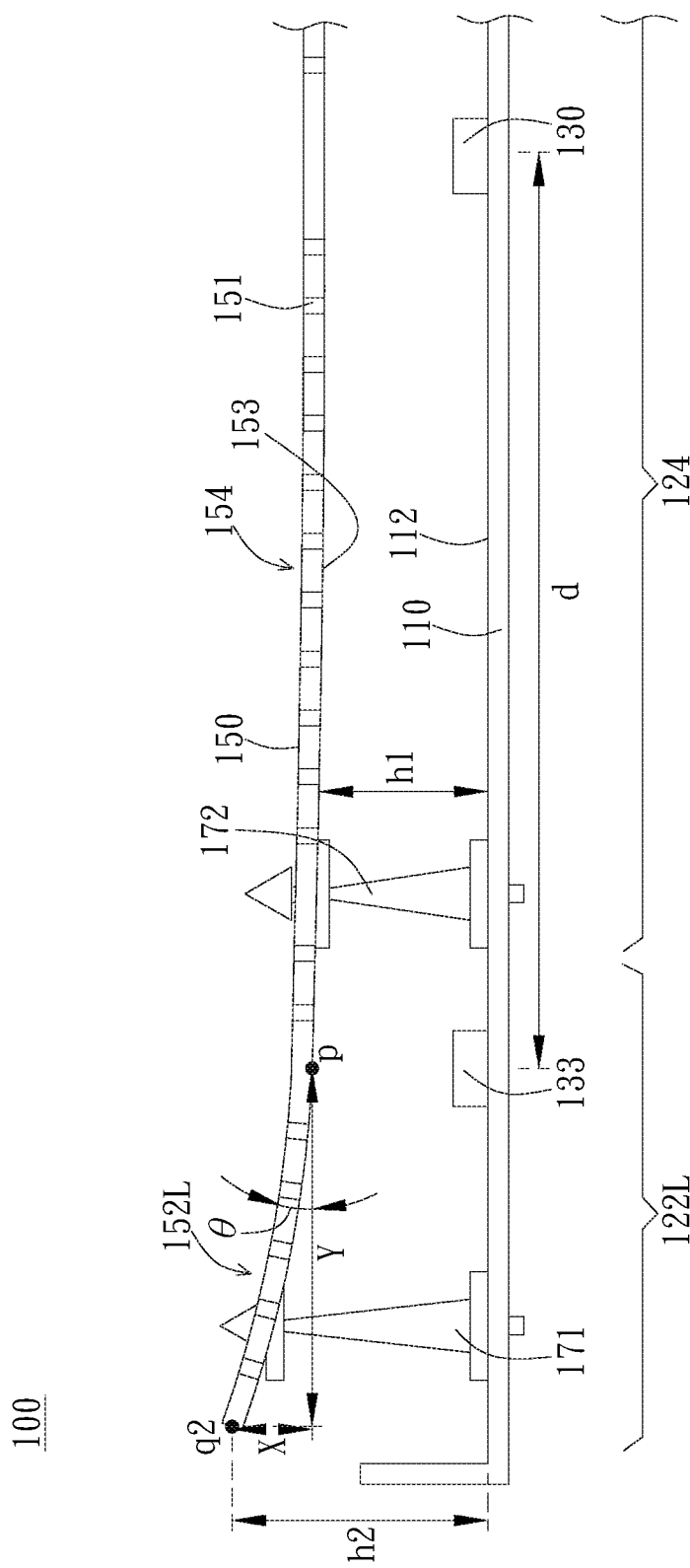
FIG. 9 is a cross-sectional view of the backlight module of FIG. 8.

FIG. 9 is an embodiment of a cross-sectional view of the backlight module 100 of FIG. 8 corresponding to the periphery area 152L. As illustrated in FIG. 9, the first supporting unit 171 and the second supporting unit 172 is disposed on the supporting surface 112. The first supporting unit 171 is disposed on the supporting surface 112 and supports or sustains the periphery area 152L, whereas the second supporting unit 172 is disposed on the supporting surface 112 and supports or sustains the central area 154. The length of the first supporting unit 171 is greater or larger than the length of the second supporting unit 172. By using the second supporting unit 172 as a fixing point in conjunction with the larger length of the first supporting unit 171, the periphery area 152L of the optical modulation film 150 propped up to form a curvature surface non-parallel to the supporting surface 112. The average perpendicular distance between the periphery area 152L and the supporting surface 112 is different from the average perpendicular distance between the central area 154 and the supporting surface 112. As shown in FIG. 9, the periphery light source 130 on the optical modulation film 150 has a light source projecting position p. As the distance of each position in the periphery area 152 with the light source projecting position p increases, the average perpendicular distance with the supporting surface 112 will increase. In particular, with respect to the positions on the periphery area 152L, the perpendicular distance between the periphery area 122L and the horizontal plane that the periphery area 122L lies on will increase as the distance between each position in the periphery area 152L with the light source projecting position p increases. In other words, the closer to the periphery of the periphery area 152L one gets, the perpendicular distance between the optical modulation film 150 and the supporting surface 112 will increase.

Furthermore, the periphery area 152L has a periphery position q2, wherein the horizontal distance between the periphery position q2 of the periphery area and the light source projecting position p is referred to as Y. A perpendicular distance h2 between the periphery position q2 of the periphery area 152L and the supporting surface 112 exists (ie. there is a perpendicular distance h2 between the periphery position q2 and the horizontal plane that the periphery projecting area 122L lies on). The place where the central area near the second supporting unit 172 has a perpendicular distance h1 with the supporting surface 112. The difference between the perpendicular distance h1 and the perpendicular distance h2 is X. Angle θ represents the angle between the horizontal planar surface with the line through the light source projecting position p and the periphery position q2 of the periphery area, wherein X, Y, and θ satisfy the following:

$$\tan^{-1}(X/Y)=\theta$$

Testing on the backlight module has found, with regards to output light distribution, that when the perpendicular distance h1 is smaller than 10 mm, angle θ smaller than 10 degrees can increase brightness levels in the corner area (ie. when the angle of propping up is smaller than 10 degrees, $\tan^{-1}(X/Y) \leq 10$ degrees). In addition, by adjusting the horizontal distance Y between the vertex position q and the light source projecting position p to be substantially 0.4~0.6 times the spacing distance d between neighboring light sources (ie. $0.4d \leq Y \leq 0.6d$) in conjunction with $\tan^{-1}(X/Y) \leq 10$ degrees, brightness levels in the corner area may be increased more effectively. Further tests also show that when $\tan^{-1}(X/Y)$ is between 3 and 5 degrees, the light output is better and the light distribution near the periphery of the display surface can be made more uniform. In this manner, during the product development stage and in accordance to the above mentioned relationship and testing results, with the required perpendicular distance between the central area and supporting surface determined, the curvature levels of the optical modulation film 150 may be suitably adjusted to accomplish better display quality.

Although the embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:
1. A backlight module comprising:
a supporting plate having a supporting surface;
a light source module comprising a plurality of light sources disposed on the supporting surface, the plurality of light sources comprising a periphery light source disposed closer to an edge of the supporting surface than other light sources; and
an optical modulation film disposed above the light source module and having a plurality of light exiting holes, light generated from the light source module being distributed by the optical modulation film and emitting via the plurality of light exiting holes at different positions;
wherein the optical modulation film has a periphery area and a central area; an average perpendicular distance between the periphery area and the supporting surface is different from an average perpendicular distance between the central area and the supporting surface; the periphery light source has a light source projecting position formed on the optical modulation film; when a distance between the light source projecting position and a position in the periphery area disposed along a direction toward a peripheral edge of the optical modulation film is increased, a perpendicular distance between the position in the periphery area and the supporting surface is increased, and at least a corner of the optical modulation film is curved away from the supporting surface in each of a length and a width direction of the optical modulation film such that the perpendicular distance between the periphery area and the supporting surface increases along directions towards a vertex position of the at least a corner of the optical modulation film.

2. The backlight module of claim 1, wherein the periphery area comprises a corner area corresponding to the at least a corner of the optical modulation film, and the periphery light source is disposed corresponding to the corner area; the corner area has the vertex position farthest from the light source projecting position; a horizontal distance between the vertex position and the light source projecting position is Y, and the difference of the perpendicular distance between the vertex position and the supporting surface and the perpendicular distance between the central area and the supporting surface is X; X and Y have the following relationship:

$$\tan^{-1}(X/Y) \leq 10°.$$

3. The backlight module of claim 2, wherein the value of $\tan^{-1}(X/Y)$ is between 3° and 5°.

4. The backlight module of claim 2, wherein the horizontal distance between the vertex position and the light source projecting position is substantially between 0.4~0.6 times of a pitch of two adjacent light sources.

5. The backlight module of claim 1, further comprising:
a first supporting unit disposed on the supporting surface to sustain the periphery area; and
a second supporting unit disposed on the supporting surface to sustain the central area;
wherein the length of the first supporting unit is longer than the length of the second supporting unit.

6. The backlight module of claim 1, further comprising a first supporting unit disposed on the supporting plate to sustain the periphery area; wherein the supporting plate comprises an inclined sidewall encircling the supporting surface, and the first supporting unit is disposed on the inclined sidewall.

7. The backlight module of claim 1, further comprising a first supporting unit disposed on the supporting surface to sustain the periphery area; wherein the supporting plate comprises an inclined sidewall encircling the supporting surface, and the first supporting unit extends to lie against the inclined sidewall to sustain the periphery area.

8. The backlight module of claim 1, wherein a portion of the periphery area is distributed along peripheral edges of the optical modulation film; an average perpendicular distance between the portion of the periphery area and the supporting surface is different from the average perpendicular distance between the central area and the supporting surface.

9. The backlight module of claim 8, where when a distance between the light source projecting position and a position in the portion of the periphery area is increased, a perpendicular distance between the position in the portion of the periphery area and the supporting surface is increased.

10. The backlight module of claim 9, wherein a horizontal distance between the light source projecting position and an outer edge of the portion of the periphery area is Y, and the difference of the perpendicular distance between the outer edge of the portion of the periphery area and the supporting surface and the perpendicular distance between the central area and the supporting surface is X; X and Y have the following relationship:

$$\tan^{-1}(X/Y) \leq 10°.$$

11. The backlight module of claim 10, wherein the value of $\tan^{-1}(X/Y)$ is between 3° and 5°.

12. The backlight module of claim 10, wherein the horizontal distance between the outer edge of the portion of the periphery area and the light source projecting position is substantially between 0.4~0.6 times of a pitch of two adjacent light sources.

13. A backlight module comprising:
a supporting plate having a supporting surface;
a light source module comprising a plurality of light sources disposed on the supporting surface, the plurality of light sources comprising a periphery light source disposed closer to an edge of the supporting surface than other light sources; and
an optical modulation film disposed above the light source module and having a plurality of light exiting holes, light generated from the light source module being distributed by the optical modulation film and emitting via the plurality of light exiting holes at different positions;
wherein the optical modulation film has a periphery area and a central area; the periphery area and the central area form a periphery projecting area and a central projecting area on the supporting surface, respectively; the central area and the central projecting area are relatively parallel to each other in comparison with the periphery area and the periphery projecting area; the periphery light source has a light source projecting position formed on the optical modulation film; when a distance between the light source projecting position and a position in the periphery area disposed along a direction toward a peripheral edge of the optical modulation film is increased, a perpendicular distance between the position in the periphery area and the supporting surface is increased, and at least a corner of the optical modulation film is curved away from the supporting surface in each of a length and a width direction of the optical modulation film such that the perpendicular distance between the periphery area and the supporting surface increases along directions towards a vertex position of the at least a corner of the optical modulation film.

14. The backlight module of claim 13, wherein the periphery area comprises a corner area corresponding to the at least a corner of the optical modulation film, and the periphery light source is disposed corresponding to the corner area; the corner area has the vertex position farthest from the light source projecting position; a horizontal distance between the vertex position and the light source projecting position is Y, and the difference of the perpendicular distance between the vertex position and the supporting surface and the perpendicular distance between the central area and the supporting surface is X; X and Y have the following relationship:

$$\tan^{-1}(X/Y) \leq 10°.$$

15. The backlight module of claim 14, wherein the value of $\tan^{-1}(X/Y)$ is between 3° and 5°.

16. The backlight module of claim 14, wherein the horizontal distance between the vertex position and the light source projecting position is substantially between 0.4~0.6 times of a pitch of two adjacent light sources.

17. The backlight module of claim 13, further comprising:
a first supporting unit disposed on the supporting surface to sustain the periphery area; and
a second supporting unit disposed on the supporting surface to sustain the central area;
wherein the length of the first supporting unit is longer than the length of the second supporting unit.

18. The backlight module of claim 13, further comprising a first supporting unit disposed on the supporting plate to sustain the periphery area; wherein the supporting plate comprises an inclined sidewall encircling the supporting surface, and the first supporting unit is disposed on the inclined sidewall.

19. The backlight module of claim 13, further comprising a first supporting unit disposed on the supporting surface to sustain the periphery area; wherein the supporting plate comprises an inclined sidewall encircling the supporting surface, and the first supporting unit extends to lie against the inclined sidewall to sustain the periphery area.

20. The backlight module of claim 13, wherein a portion of the periphery area is distributed along peripheral edges of the optical modulation film; the portion of the periphery area forms a projecting area of the portion of the periphery area on the supporting surface; the central area and the central projecting area are relatively parallel to each other in comparison with the portion of the periphery area and the projecting area of the portion of the periphery area.

21. The backlight module of claim 20, wherein when a distance between the light source projecting position and a position in the portion of the periphery area is increased, a perpendicular distance between the position in the portion of the periphery area and a plane of the projecting area of the portion of the periphery area is increased.

22. The backlight module of claim 21, wherein a horizontal distance between the light source projecting position and an outer edge of the portion of the periphery area is Y, and the difference of the perpendicular distance between the outer edge of the portion of the periphery area and the plane of the projecting area of the portion of the periphery area and the perpendicular distance between the central area and the supporting surface is X; X and Y have the following relationship:

$$\tan^{-1}(X/Y) \leq 10°.$$

23. The backlight module of claim 22, wherein the value of $\tan^{-1}(X/Y)$ is between 3° and 5°.

24. The backlight module of claim 22, wherein the horizontal distance between the outer edge of the portion of the periphery area and the light source projecting position is substantially between 0.4~0.6 times of a gap of two adjacent light sources.

* * * * *